United States Patent
Saxe et al.

(10) Patent No.: US 10,649,970 B1
(45) Date of Patent: May 12, 2020

(54) METHODS AND APPARATUS FOR DETECTION OF FUNCTIONALITY

(71) Applicant: INVINCEA, INC., Fairfax, VA (US)

(72) Inventors: Joshua Daniel Saxe, Washington, DC (US); David Peter Mentis, Fairfax, VA (US); Anthony Chungku Wong, Arlington, VA (US)

(73) Assignee: Invincea, Inc., Reston, VA (US)

( * ) Notice: Subject to any disclaimer, the term of this patent is extended or adjusted under 35 U.S.C. 154(b) by 455 days.

(21) Appl. No.: 14/212,659

(22) Filed: Mar. 14, 2014

Related U.S. Application Data

(60) Provisional application No. 61/781,185, filed on Mar. 14, 2013.

(51) Int. Cl.
*G06F 16/22* (2019.01)
*G06F 16/2455* (2019.01)

(52) U.S. Cl.
CPC .... *G06F 16/2272* (2019.01); *G06F 16/24558* (2019.01)

(58) Field of Classification Search
None
See application file for complete search history.

(56) References Cited

U.S. PATENT DOCUMENTS

| | | | |
|---|---|---|---|
| 6,226,629 B1 | 5/2001 | Cossock | |
| 7,231,440 B1 * | 6/2007 | Kouznetsov | H04L 63/145 707/999.001 |
| 7,739,100 B1 * | 6/2010 | Muttik | G06F 9/455 703/26 |
| 8,028,338 B1 * | 9/2011 | Schneider | G06F 21/564 713/188 |

(Continued)

FOREIGN PATENT DOCUMENTS

| | | |
|---|---|---|
| EP | 3018879 | 5/2015 |
| WO | WO 2017/223294 | 12/2017 |

OTHER PUBLICATIONS

Avira natural language descriptor sample page, accessed Oct. 30, 2017 at https://web.archive.org/web/20101006002848/https://www.avira.com/en/support-virus-lab.*

(Continued)

*Primary Examiner* — Jeff A Burke
*Assistant Examiner* — Edward Jacobs
(74) *Attorney, Agent, or Firm* — Cooley LLP

(57) ABSTRACT

In some embodiments, a method includes receiving a plurality of descriptors via a network. Each descriptor includes at least one of a descriptor component or a keyword. The method further includes storing the plurality of descriptors in a database, and generating a database index of the plurality of descriptors based on at least one of the descriptor component or the keyword for each descriptor of the plurality of descriptors. The method further includes storing the database index in the database. The method further includes receiving a file component extracted from a file and identifying, based on the file component, a set of descriptors from the plurality of descriptors. The method further includes inferring, based on the set of descriptors, a measure of likelihood of a functionality associated with the file, and transmitting an indication of the measure to a user.

31 Claims, 5 Drawing Sheets

(56) References Cited

U.S. PATENT DOCUMENTS

| | | | |
|---|---|---|---|
| 8,056,134 B1* | 11/2011 | Ogilvie | G06F 21/566 713/187 |
| 8,095,981 B2 | 1/2012 | Rabinovitch | |
| 8,181,251 B2* | 5/2012 | Kennedy | G06F 21/563 709/201 |
| 8,291,497 B1 | 10/2012 | Griffin | |
| 8,312,539 B1* | 11/2012 | Nachenberg | G06F 21/566 713/188 |
| 8,312,545 B2* | 11/2012 | Tuvell | G06F 21/56 726/24 |
| 8,413,244 B1 | 4/2013 | Nachenberg et al. | |
| 8,505,094 B1* | 8/2013 | Xuewen | H04L 67/2819 726/22 |
| 8,521,667 B2 | 8/2013 | Zhu et al. | |
| 8,701,190 B1* | 4/2014 | Chau | G06F 21/56 709/223 |
| 8,838,992 B1* | 9/2014 | Zhu | G06F 21/56 713/164 |
| 9,015,814 B1 | 4/2015 | Zakorzhevsky | |
| 9,130,988 B2* | 9/2015 | Seifert | H04L 63/1416 |
| 9,177,144 B2* | 11/2015 | Alme | G06F 21/563 |
| 9,672,358 B1 | 6/2017 | Long et al. | |
| 9,690,938 B1 | 6/2017 | Saxe et al. | |
| 9,705,904 B1 | 7/2017 | Davis et al. | |
| 9,910,986 B1 | 3/2018 | Saxe et al. | |
| 9,940,459 B1 | 4/2018 | Saxe | |
| 10,104,100 B1 | 10/2018 | Bogorad | |
| 10,303,875 B1 | 5/2019 | Saxe et al. | |
| 10,318,735 B2 | 6/2019 | Saxe | |
| 2005/0050335 A1* | 3/2005 | Liang | G06F 21/56 713/188 |
| 2005/0166046 A1 | 7/2005 | Bellovin et al. | |
| 2005/0187740 A1 | 8/2005 | Marinescu | |
| 2005/0223238 A1 | 10/2005 | Schmid et al. | |
| 2006/0015630 A1 | 1/2006 | Stolfo | |
| 2006/0230453 A1* | 10/2006 | Flynn | G06F 21/125 726/24 |
| 2007/0006027 A1* | 1/2007 | Desouza | H04L 51/04 714/12 |
| 2007/0220607 A1* | 9/2007 | Sprosts | G06Q 10/107 726/24 |
| 2007/0240221 A1* | 10/2007 | Tuvell | G06F 21/56 726/24 |
| 2007/0283440 A1* | 12/2007 | Yao | G06F 21/564 726/24 |
| 2008/0010232 A1* | 1/2008 | Kant | G06N 7/005 706/52 |
| 2008/0127336 A1* | 5/2008 | Sun | G06F 21/566 726/22 |
| 2008/0140662 A1 | 6/2008 | Pandya | |
| 2009/0024992 A1* | 1/2009 | Kulaga | G06F 9/44505 717/177 |
| 2009/0044024 A1 | 2/2009 | Oberheide et al. | |
| 2009/0100055 A1 | 4/2009 | Wang | |
| 2009/0172815 A1 | 7/2009 | Gu | |
| 2009/0293125 A1 | 11/2009 | Szor | |
| 2010/0115620 A1* | 5/2010 | Alme | G06F 21/563 726/24 |
| 2010/0162395 A1* | 6/2010 | Kennedy | G06F 21/563 726/23 |
| 2011/0154495 A1* | 6/2011 | Stranne | G06F 21/55 726/24 |
| 2011/0179484 A1* | 7/2011 | Tuvell | G06F 21/56 726/22 |
| 2011/0214161 A1 | 9/2011 | Stolfo et al. | |
| 2011/0225655 A1* | 9/2011 | Niemela | G06F 21/566 726/24 |
| 2012/0121194 A1* | 5/2012 | Yagnik | G06F 16/41 382/225 |
| 2012/0158626 A1 | 6/2012 | Zhu et al. | |
| 2012/0159620 A1* | 6/2012 | Seifert | H04L 63/1416 726/22 |
| 2012/0210423 A1* | 8/2012 | Friedrichs | G06F 21/564 726/22 |
| 2012/0233127 A1 | 9/2012 | Solmer et al. | |
| 2012/0233693 A1* | 9/2012 | Stites | H04L 63/1416 726/23 |
| 2012/0323829 A1* | 12/2012 | Stokes | G06F 21/563 706/12 |
| 2013/0167236 A1* | 6/2013 | Sick | G06F 21/56 726/24 |
| 2013/0246352 A1* | 9/2013 | Spurlock | G06F 16/137 707/615 |
| 2013/0276114 A1 | 10/2013 | Friedrichs et al. | |
| 2014/0090061 A1 | 3/2014 | Avasarala | |
| 2014/0298460 A1 | 10/2014 | Xue et al. | |
| 2015/0242626 A1 | 8/2015 | Wang | |
| 2015/0302268 A1 | 10/2015 | Collet et al. | |
| 2015/0312189 A1 | 10/2015 | Lee | |
| 2015/0379427 A1 | 12/2015 | Dirac | |
| 2016/0014149 A1 | 1/2016 | Bradley | |
| 2016/0156460 A1 | 6/2016 | Feng et al. | |
| 2016/0239706 A1 | 8/2016 | Dijkman et al. | |
| 2017/0017795 A1 | 1/2017 | DiGiambattista | |
| 2017/0085585 A1 | 3/2017 | Morkovský | |
| 2017/0134404 A1 | 5/2017 | Machlica et al. | |
| 2017/0228641 A1 | 8/2017 | Sohn | |
| 2017/0372071 A1 | 12/2017 | Saxe | |
| 2018/0041536 A1 | 2/2018 | Berlin | |
| 2018/0285740 A1 | 10/2018 | Smyth et al. | |
| 2019/0278909 A1 | 9/2019 | Saxe | |

OTHER PUBLICATIONS

Office Action for U.S. Appl. No. 14/716,290 dated Aug. 4, 2016.
Office Action for U.S. Appl. No. 15/228,728 dated Oct. 21, 2016.
V. Sai Sathyanarayan, et al., "Signature Generation and Detection of Malware Families". In Proceedings of the 13th Australasian conference on Information Security and Privacy (ACISP '08), Yi Mu, Willy Susilo, and Jennifer Seberry (Eds.). Springer-Verlag, Heidelberg, pp. 336-349.
Robert Morris, "Counting large numbers of events in small registers", Commun. ACM 21, Oct. 10, 1978, pp. 840-842.
ThreatExpert, Geographic Distribution of Threats—retrieved from the Internet—http://web.archive.org/web/20130115040419/http://threatexpert.com/ dated Jan. 15, 2013.
Josh Saxe, et al., "Visualization of Shared System Call Sequence Relationships in Large Malware Corpora," Proceedings of the ninth internaitonal symposium on visualization for cyber security, ACM, Oct. 15, 2012, pp. 33-40.
Kent Griffin, et al., "Automatic Generation of String Signatures for Malware Detection," International Workshop on Recent Advances in Intrusion Detection. Springer Berlin Heidelberg, 2009.
Joshua Saxe, Why Security Data Science Matters and How its Different: Pitfalls and Promises of Data Science Based Breach Detection and Threat Intelligence, Retrieved from the Internet—https://www.blackhat.com/us-15/briefings.html#Joshua-Saxe, Aug. 2015.
Deguang Kong and Guanhua Yan, "Discriminant malware distance learning on structural information for automated malware classification", Proceedings of the 19th ACM SIGKDD international conference on Knowledge discovery and data mining, ACM, 2013.
Final Office Action for U.S. Appl. No. 14/716,290 dated. Jun. 1, 2017.
Joshua Saxe, et al., "CrowdSource: Automated Inference of High Level Functionality from Low-Level Symbols Using a Crowd Trained Machine Learning Model," IEEE, 9th International Conference, Oct. 28, 2014, pp. 68-75.
Konstantin Berlin, et al., "Malicious Behavior Detection using Windows Audit Logs," Proceedings of the 8th ACM Workshop on Artificial Intelligence and Security, Oct. 16, 2015, pp. 35-44.
Joshua Saxe, et al., "Deep Neural Network Based Metlware Detection Using Two Dimensional Binary Program Features," IEEE, Oct. 20, 2015, pp. 11-20.
Joshua Saxe, "Why Security Data Science Matters and How its Different: Pitfalls and Promises of Data Science Based Breach Detection and Threat Intelligence," Presentation, BlackHat USA2015, Aug. 1-6, 2015.

(56) References Cited

OTHER PUBLICATIONS

Kolter, et al., "Learning to Detect and Classify Malicious Executables in the Wild," Journal of Machine Learning Research, vol. 7, 2006, pp. 2721-2744.

Office Action for U.S. Appl. No. 15/616,391, dated Sep. 22, 2017, 6 pages.

International Search Report and Written Opinion for International Application No. PCT/US2017/038715, dated Sep. 6, 2017, 8 pages.

Search Report for UK Patent Application No. GB 1712454.6, dated Jan. 15, 2018, 4 pages.

Bulut, I. et al., "Mobile malware detection using deep neural network," Signal Processing and Communications Applications Conference (SIU), May 15-18, 2017 (with English Abstract).

Saxe, J. et al., "Deep Neural Network Based Malware Detection Using Two Dimensional Binary Program Features," 2015 10th International Conference on Malicious and Unwanted Software: "Know Your Enemy" (MALWARE), 2015, pp. 11-20.

Saxe, J. et al., "eXpose: A Character-Level Convolutional Neural Network with Embeddings for Detecting Malicious URLs, File Paths and Registry Keys," arXiv:1702.08568v1 (Feb. 27, 2017), 18 pages.

Van Durme, B. et al., "Probabilistic counting with randomized storage," In Proceedings of the 21st International Joint Conference on Artificial intelligence (IJCAI'09), Hiroaki Kitano (ed.). (2009), Morgan Kaufmann Publishers Inc., San Francisco, CA, USA, 1574-1579.

Notice of Allowance for U.S. Appl. No. 15/877,676, dated Jan. 18, 2019, 5 pages.

Notice of Allowance for U.S. Appl. No. 15/630,495, dated Jan. 28, 2019, 14 pages.

International Preliminary Report on Patentability for International Application No. PCT/US2017/038715, dated Dec. 25, 2018, 7 pages.

Gilbert, "Convolutional Neural Networks for Malware Classification", Oct. 20, 2016, a thesis presented for the degree of Master in Artificial Intelligence, pp. 1-100.

Kolosnjaji, et al, "Empowering Convolutional Networks for Malware Classification and Analysis", no date provided, Technical University of Munich, pp. 1-8.

Office Action for U.S. Appl. No. 15/877,676, dated Sep. 14, 2018, 6 pages.

Schroff, F. et al., "FaceNet: A Unified Embedding for Face Recognition and Clustering," Computer Vision Foundation, 2015 [online], Retrieved from the Internet: <URL: https://www.cv-foundation.org/openaccess/content_cypr_2015/papers/Schroff_FaceNet_A_Unified_2015_CVPR_paper.pdf>, pp. 815-823.

Doersch, C., "Tutorial on Variational Autoencoders," arXiv:1606.05908v2 [stat.ML], Aug. 16, 2016, 23 pages.

Dahl, et al., "Large-scale malware classification using random projections and neural networks." International Workshop on Acoustic Signal Enhancement 2012, Institute of Electrical and Electronics Engineers (2013); 3422-3426.

Extended European Search Report for European Application No. 17816199.8 dated Apr. 9, 2019, 8 pages.

Wang, Y., et al., "A deep learning approach for detecting malicious JavaScript code." Security and Communications Networks (2016); 9(11): 1520-1534.

Office Action for U.S. Appl. No. 15/666,859, dated Oct. 21, 2019, 25 pages.

Luo, et al., "Deep Learning With Noise". Retrieved Oct. 15, 2019 from https://pdfs.semanticscholar.org/d79b/a428e1cf1b8aa5d320a93166315bb30b4765.pdf, 9 pages (indicated by the Examiner in U.S. Appl. No. 15/666,859 as being published in 2014).

* cited by examiner

मेTHODS AND APPARATUS FOR
DETECTION OF FUNCTIONALITY

CROSS-REFERENCE TO RELATED APPLICATION

This application claims priority to and the benefit of U.S. Provisional Patent Application No. 61/781,185, filed Mar. 14, 2013 and entitled "METHODS AND APPARATUS FOR PERFORMING AUTOMATIC DETECTION OF THE FUNCTIONALITY OF MALICIOUS SOFTWARE BY MINING WEB TECHNICAL DOCUMENT CORPORA," which is incorporated herein by reference in its entirety.

GOVERNMENT LICENSE RIGHTS

This invention was made with government support under contract no. FA8750-10-C-0169 awarded by the Air Force Research Laboratory (AFRL/RIKF). The government has certain rights in the invention.

BACKGROUND

Some embodiments described herein relate generally to detection of functionality in files, and, in particular, to inferring functionality in files based on file components extracted from the file and based on descriptors obtained via a network.

Malware, short for malicious software, is software designed to infiltrate a computer system without the owner's informed consent. The expression is a general term used by computer professionals to mean a variety of forms of hostile, intrusive, or annoying software and/or program code. Malware presents security risks and/or issues for computer systems.

Reverse engineering of malware to understand functionality, particularly in malicious software artifacts or malware, is desirable for designing solutions to the malware. This is currently a slow manual process requiring expensive expert labor.

Accordingly, a need exists for automatic malware capability identification based on commonly available technical documents.

SUMMARY

In some embodiments, a method includes receiving a set of descriptors from a set of servers operatively coupled to a network. Each descriptor includes at least one of a descriptor component or a keyword. The method further includes storing the set of descriptors in a database, and generating a database index of the set of descriptors based on at least one of the descriptor component or the keyword for each descriptor from the set of descriptors. The method further includes storing the database index in the database. The method further includes receiving a file component extracted from a file and identifying, based on the file component, a subset of descriptors from the set of descriptors. The method further includes inferring, based on the subset of descriptors, a measure of likelihood of a functionality associated with the file, and transmitting an indication of the measure to a user.

DESCRIPTION

In some embodiments, a method includes receiving a set of descriptors from a set of servers operatively coupled to a network. Each descriptor includes at least one of a descriptor component and/or a keyword. The method further includes storing the set of descriptors in a database, and generating a database index of the set of descriptors based on at least one of the descriptor component or the keyword for each descriptor from the set of descriptors. The method further includes storing the database index in the database. The method further includes receiving a file component extracted from a file and identifying, based on the file component, a subset of descriptors from the set of descriptors. The method further includes inferring, based on the subset of descriptors, a measure of likelihood of a functionality associated with the file, and transmitting an indication of the measure to a user.

In some embodiments, a method includes receiving multiple file components extracted from a file, and receiving an indication of a functionality of the file from a user. The method further includes identifying a set of first descriptors associated with each file component from multiple file components, and identifying, based on the indication of the functionality, a set of second descriptors. The method further includes inferring, based on the set of first descriptors and the set of second descriptors, a measure of likelihood of the functionality associated with the file. The method further includes transmitting an indication of the measure to a user.

In some embodiments, an apparatus includes an extractor module implemented in at least one of a memory or a processing device. The extractor module is configured to extract multiple file components from a file. The apparatus further includes an inference engine operatively coupled to the extractor module, the inference engine configured to receive the multiple file components from the extractor. The inference engine is further configured to generate a group including two or more file components from the multiple file components, and to transmit an indication of the group to a user. The inference engine is further configured to receive, from the user, an indication of a functionality of the file in response to the indication of the group. The inference engine is further configured to identify a set of first descriptors associated with each file component from the multiple file components, and to identify, based on the indication of the functionality, a set of second descriptors. The inference engine is further configured to infer, based on the set of first descriptors and the set of second descriptors, a measure of likelihood of the functionality associated with the file. The inference engine is further configured to transmit an indication of the measure to a user.

Figure 1:
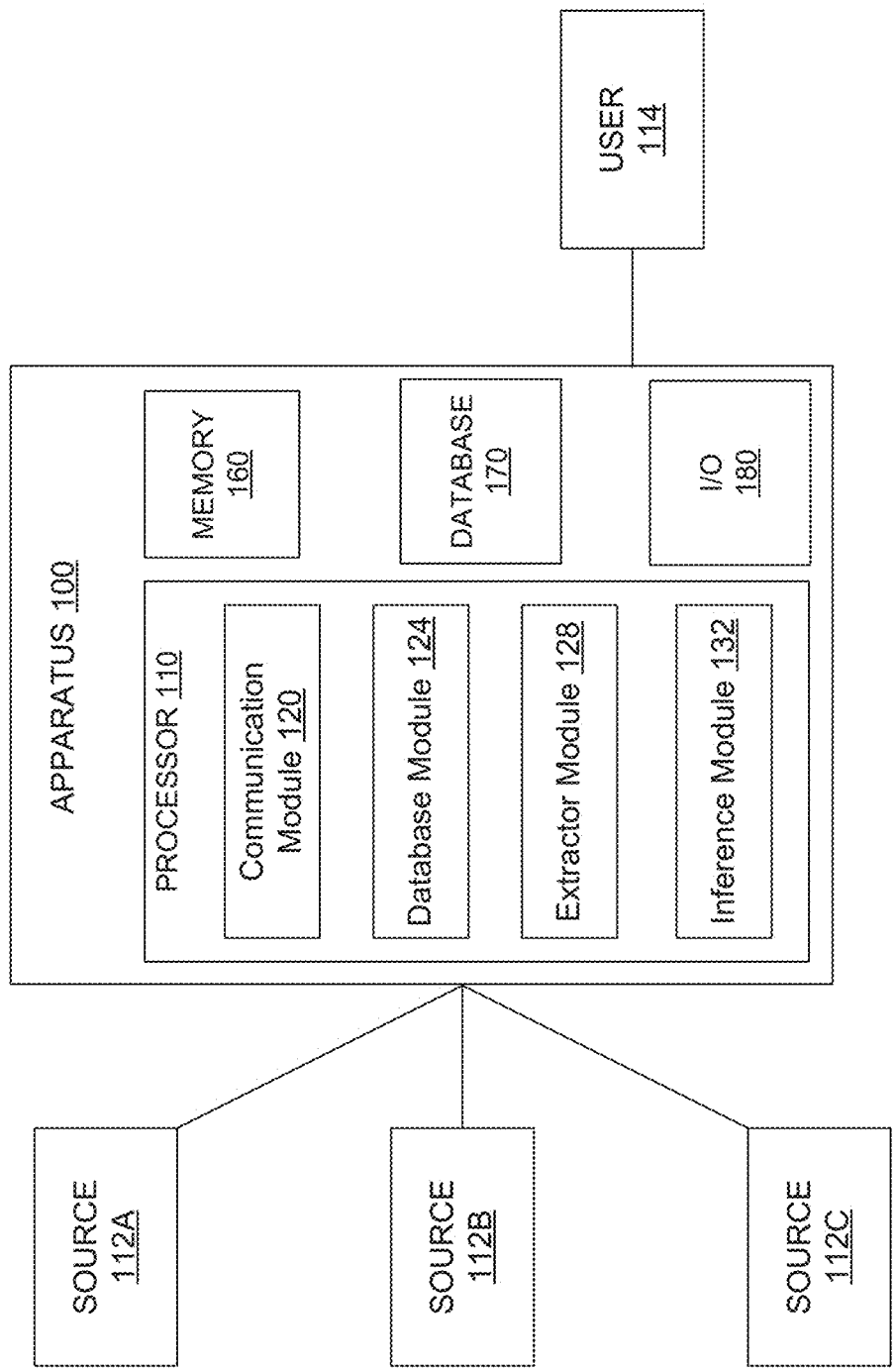
FIG. 1 is a schematic diagram that illustrates an apparatus configured to infer a measure of likelihood of a functionality associated with the file, according to an embodiment.

FIG. 1 is a schematic diagram of an apparatus 100 configured to infer the functionality associated with a file. The term "functionality" and/or "capability" as used herein with reference to a file, is intended to encompass any process(es), step(s), executable action(s), and/or the like that the file can be capable of performing when executed. The functionality can include high level actions (i.e., by a high level programming language) and/or low level actions (i.e., by low level programming, such as assembly language programming) The file itself can be in any suitable format, including, but not limited to, an executable, a binary file, an assembly language file, a file derived therefrom, and/or the like.

In some embodiments, the apparatus 100 is configured to infer a measure of likelihood of a functionality associated with the file. Said another way, the measure can be predictive, and it is not necessary for the file to have the purported functionality. In some embodiments, the measure can be at least one of a qualitative measure (e.g., a descriptive indicator of the purported functionality), a binary measure (e.g., a yes/no indicator), a probabilistic measure (e.g., a number between 0 and 1, including all values and sub ranges in between), a percentage measure (e.g., greater than 50%, less than 15% chance, between 20-25% chance, and/or the like), and/or the like.

The apparatus 100 can be any device with certain data processing and/or computing capabilities such as, for example, a server, a workstation, a compute device, a tablet, a mobile device, and/or the like. As shown in FIG. 1, the apparatus 100 includes a processor 110, a memory 160, input/output interfaces 180, and/or other component(s) (not shown in FIG. 1). FIG. 1 also illustrates that the apparatus 100 includes a database 170, although it is understood that in another embodiment, the database 170 can be external to the apparatus 100, and in yet another embodiments, the database 170 and the memory 160 can be the same.

The memory 160 can be, for example, a Random-Access Memory (RAM) (e.g., a dynamic RAM, a static RAM), a flash memory, a removable memory, and/or so forth. In some embodiments, instructions associated with performing the operations described herein (e.g., fault detection) can be stored within the memory 160 and executed at the processor 110. The processor 110 includes a communication module 120, a database module 124, an extractor module 128, an inference module 132, and/or other module(s) (not shown in FIG. 1). As will be described in more detail later, the apparatus 100 can be in communication with one or more sources 112A-112C of descriptors. The apparatus 100 can be operated and controlled by a user 114 such as, for example, an operator, an administrator, a device associated therewith, and/or the like.

Each module in the processor 110 can be any combination of hardware-based module (e.g., a field-programmable gate array (FPGA), an application specific integrated circuit (ASIC), a digital signal processor (DSP)), hardware-based module executing software (e.g., a module of computer code stored in the memory 160 and/or executed at the processor 110), and/or a combination of hardware- and software-based modules. Each module in the processor 110 is capable of performing one or more specific functions/operations as described herein (e.g., associated with an extraction operation), as described in further detail with respect to FIG. 1. In some embodiments, the modules included and executed in the processor 110 can be, for example, a process, application, virtual machine, and/or some other hardware and/or software module (stored in memory and/or executing in hardware). The processor 110 can be any suitable processor configured to run and/or execute those modules.

In some embodiments, the processor 110 can include more or less modules than those shown in FIG. 1. For example, the processor 110 can include more than one compute module to simultaneously perform multiple computing tasks for multiple systems and/or processes. In some embodiments, the apparatus 100 can include more components than those shown in FIG. 1. In some embodiments, the apparatus 100 can include or be coupled to an output (e.g., a printer, a monitor, a speaker, a display device such as a touch screen, etc.), such that an output of the apparatus (e.g., an indication of the measure of likelihood) can be presented to the user 114 via the output.

As used herein, a module can be, for example, any assembly and/or set of operatively-coupled electrical components associated with performing a specific function, and can include, for example, a memory, a processor, electrical traces, optical connectors, hardware executing software and/or the like. As used herein, the singular forms "a," "an" and "the" include plural referents unless the context clearly dictates otherwise. Thus, for example, the term "a communication module" is intended to mean a single module or a combination of modules configured to communicate with the sources 112A-112C and/or the user 114. The user 114 can be any suitable entity, including a human entity interacting with the apparatus 114, another device, apparatus, system, process, including any sub-component (e.g., a sub-system) thereof, and/or the like. In some embodiments, the user 114 includes at least a processor and a memory.

In some embodiments, as shown in FIG. 1, the apparatus 100 can be operatively coupled to the sources 112A-112C (and optionally, the user 114) via, for example, a network. The network can be any type of network that can operatively connect and enable data transmission between the apparatus 100 and the sources 112A-112C. The network can be, for example, a wired network (an Ethernet, a local area network (LAN), etc.), a wireless network (e.g., a wireless local area network (WLAN), a Wi-Fi network, etc.), or a combination of wired and wireless networks (e.g., the Internet, etc.). In some other embodiments, the apparatus 100 can be physically connected to the sources 112A-112C and/or the user 114.

The sources 112A-112C can be any suitable entities operably linked and/or communicatively coupled to the apparatus 100 and capable of providing descriptors to the apparatus 100. In some embodiments, each of the sources 112A-112C can independently be a device, apparatus, system, process, database, non-transitory storage medium, server, web page presented by a server, and/or any sub-component (e.g., a sub-system) thereof. In some embodiments, the sources 112A-112C can provide descriptors to the apparatus 100 in response to a query from the apparatus. In some embodiments, the sources 112A-112C can periodically provide descriptors to the apparatus 100. For example, a source 112A-112C can be a server presenting an Internet blog and/or message board associated with different function calls and their relationship to other function calls and/or malicious actions.

The term "descriptor" as used herein is intended to encompass any content that is descriptive of functionality of a file. A descriptor can be written in any suitable language, including natural language, symbolic language, and combinations thereof. A descriptor can be provided in any suitable data structure, such as a document, a database entry, web page and/or the like.

In some embodiments, a descriptor includes at least one of a descriptor component (also sometimes referred to as document components) and a keyword. A keyword can be any content that provides an account of the functionality, including qualities, characteristics, and/or the like. A descriptor component can be a technical feature associated with the functionality, such as a function name, a file path, and/or the like. In some embodiments, the keyword can be a plain language description, and the descriptor component can be commonly used programming syntax such as a function call. An example of such a descriptor component is the API call capCreateCaptureWindow from the Microsoft "Win32" API, which creates a new window for video stream capturing and can be used to capture a video feed from a computer.

In some embodiments, the communication module 120 can be configured to receive descriptors from the sources 112A-112C via the network. In some embodiments, the communication module 120 can be configured to search the sources 112A-112C for descriptors, on demand or periodically. In some embodiments, the user 112 can configure the communication module 120 to search the sources 112A-112C (e.g., servers and/or web pages presented by servers) periodically (e.g., at regular time intervals) for new descriptors. In some embodiments, the communication module can be configured to search the sources 112A-112C via any suitable approach for scouring the sources for descriptors, including, but not limited to, crawling/spidering (e.g., by locating information on and/or presented by the sources 112A-112C and indexing the information), tracking (e.g., via a web bot), scraping (e.g., via documents stored and/or presented by the sources), and/or the like. In some embodiments, the communication module 120 is configured to filter, organize, modify and/or otherwise manipulate the search results in any suitable manner. In some embodiments, the communication module 120 can be further configured to receive files from the user 114 for analysis (described later).

In some embodiments, the database module 124 can be configured to receive the descriptors (from the sources 112A-112C and/or from the communication module 120), and to store the descriptors, such as in the database 170 and/or the memory 160. In some embodiments, the database module 124 is further configured to generate a database index of the descriptors. The database index can be based on one or more descriptor components of each descriptor, and/or on one or more keywords of each descriptor. In some embodiments, the database index can include associations based on one or more descriptor components, and/or on one or more keywords, and combinations thereof. For example, the database index can associate function calls (similar to descriptor components) with keywords. For yet another example, the database index can associate a first function call with a second function call, which is generally used with and/or refers the first function call. The database module 124 can be further configured to store the database index in the database 170 and/or the memory 160. In embodiments where new descriptors are periodically received, the database module can be further configured to store the new descriptors to the database 170 and/or the memory 160, to update the database index (e.g., based on at least one of a descriptor component or a keyword for each descriptor from the additional descriptors), and to store the updated database index to the database 170 and/or the memory 160.

The operation of the extractor module 128 and the inference module 132 will now be described with reference to inferring the likelihood of a single file having a single functionality for simplicity, though it is understood that unless explicitly stated otherwise, aspects of the modules described herein are extendible to multiple files and/or to multiple functionalities.

In some embodiments, the extractor module 128 is configured to receive a file, such as from the user 114 and/or the communication module 120. In some embodiments, the file is at least one of a binary file or an assembly language file.

For example, the user 114 can provide a binary file of a suspected malware sample to the extractor module 128. In some embodiments (not shown) the extractor module 128 can be further configured to generate a binary file and/or an assembly language file from the received file.

In some embodiments, the extractor module 128 can be further configured to extract one or more file components from the file. In some embodiments, a file component (sometimes referred to as a first file component) can be a technical feature such as a function name, a file path, and/or the like. In some embodiments, the file component can be commonly used programming syntax such as, for example, function calls. In some embodiments, the extractor module 128 can be further configured to link, reference, and/or otherwise associate the extracted file component with one or more locations within the file that references and/or employs the file component.

The inference module 132 can be operatively coupled to the extractor module 128, and can be further configured to receive the file component from the extractor module. The inference module 132 can be further configured to identify a set of descriptors (sometimes referred to as a set of first descriptors), based on the file component, from the descriptors stored in the database 170 and/or the memory 160. In some embodiments, the inference module is configured to identify the set of descriptors by accessing the database 170 and/or the memory 160, and identifying a stored descriptor as associated with the file component (and to be included in the identified set of descriptors) when at least one descriptor component substantially matches the file component. The term "substantially" as used herein indicates that an exact match is not necessary, and that a match can be found among functionally similar variants.

For example, related file components and/or descriptors can be matched. For example, the function call "CreateFile" can be matched with the function call "CreateFileEx" because "CreateFileEx" is an extended version of "CreateFile." Thus, a file component "CreateFileEx" can be matched with a descriptor describing "CreateFile." For another example, in instances in which the file component and the descriptor component are commonly used programming syntax, upper and lower case variants of the same function call can still be matched, such as by normalizing the components to lowercase text prior to matching. For example, a file component getwindowdirect can be matched to a descriptor having the descriptor component GetWindowDirect. If the descriptor provides an explanation of GetWindowDirect being associated with malware, the inference module 132 can determine a measure of likelihood of the file being malware based on the descriptor, as described in further detail herein. As another example, a file component getwindowdirect can be matched to a descriptor having the descriptor component GetWindowDirect, and to another descriptor having a function call and/or a keyword deemed to be associated with the descriptor component GetWindowDirect, such as can be determined via the database index.

In some embodiments, a match confidence value can be assigned to a match. For example, if a match between a descriptor and a file component is an exact match, a 100% match confidence value can be assigned to the match. If, however, the match is less than an exact match (e.g., the function calls are related, the case does not exactly match, etc.), a less than 100% match confidence value can be assigned. Such a confidence value can be used by the inference module to infer a measure of likelihood, as described in further detail herein.

The inference module 132 can be further configured to infer, based on the set of descriptors, a measure of likelihood (sometimes referred to as a first measure of likelihood) of a functionality associated with the file. In some embodiments, the measure can be at least one of a qualitative measure (e.g., a descriptive indicator of the purported functionality), a binary measure (e.g., a yes/no indicator), a probabilistic measure (e.g., a number between 0 and 1, including values and sub ranges in between), a percentage measure (e.g., greater than 50%, less than 15%, between 20-25%, and/or the like), and/or the like.

In some embodiments, the file component is a first file component and the set of descriptors is a set of first descriptors, and the inference module 132 can be further configured to receive another file component (sometimes referred to as a second file component) extracted from the file by the extractor module 128. In some embodiments, the inference module 132 can be further configured to identify a set of descriptors based on the second file component (sometimes referred to as the second set of descriptors), and in a manner substantially similar to the identification of the set of first descriptors as described earlier. In such embodiments, the inference module 132 can be further configured to infer the measure of likelihood based on the set of first descriptors and the set of second descriptors.

For example, based on documents received from the sources 112A-112C, the inference module 132 can determine that a code sample and/or program including both function X and function Y has a 70% likelihood of having a characteristic normally associated with malware (e.g., 70% likely the code includes the capability to take a picture of and/or capture a user's screen). Specifically, in such an example, descriptors (e.g., message board posts) received from one or more sources 112A-112C (e.g., servers hosting the message boards) can include an explanation that a code sample and/or program including both function X and function Y is likely to have the characteristic normally associated with malware. For another example, other combinations and/or relationships between function calls and/or other file components can be used to infer the likelihood. For example, the instance of function X calling function Y, the proximity in the code of function X to function Y, the proximity of a keyword associated with function X and/or function Y, and/or the like can be used to infer the likelihood of having a characteristic normally associated with malware.

In some embodiments, the inference module 132 can then determine a percent likelihood that the code sample and/or program is malware. For example, if a percentage of descriptors, received from one or more sources 112A-112C, indicate that a code sample and/or program with the characteristic and/or including both function X and function Y is malware meets a criterion (e.g., is above a threshold), the inference module 132 can classify the code sample and/or program as likely malware. Accordingly, using descriptors and/or explanations (both indicating the combination as malware and indicating the combination as legitimate) received from the sources 112A-112C, the inference module 132 can determine that a sample provided by a user and having a characteristic has a certain percent chance of being malware.

In some embodiments, the inference module 132 receives an indication and/or specification of the functionality from the user 114, directly and/or via the communication module 120. In such embodiments, the set of descriptors can be a set of first descriptors, and the inference module 132 can be further configured to identify a set of descriptors based on the indication of the functionality received from the user (sometimes referred to as second descriptors, or third descriptors) from the descriptors stored in the database 170 and/or the memory 160. The set of descriptors based on the indication of the functionality can be the same as the set of first descriptors, or differ from the set of first descriptors in at least one descriptor. In such embodiments, the inference module 132 can be further configured to infer the measure of likelihood based on the set of first descriptors and on the set of descriptors based on the indication of the functionality received from the user. In some embodiments, the measure of likelihood is a non-null measure (e.g., greater than zero probability, greater than 0% chance, and/or the like) when at least one descriptor from the set of first descriptors is equal to at least one descriptor from the set of descriptors based on the indication of the functionality.

In some embodiments, the indication and/or specification of the functionality from the user 114 includes a keyword relationship associated with the functionality. In such embodiments, the set of descriptors can be a set of first descriptors, the inference module 132 can be further configured to access the database 170 and/or the memory 160, and to identify a descriptor based on the indication of the functionality when the keyword of the descriptor substantially satisfies the keyword relationship. For example, a keyword relationship can include the presence of certain words/strings of words/terms (including parts thereof), the order of certain words/terms, the proximity of words/terms to each other, the frequency of a word/term, the presence of related words, and/or the like. The term "substantially" as used herein indicates that an exact match is not necessary, and that a match can be established based on a match criterion, such as, for example, a minimum match percentage. For example, in instances in which the file component and the descriptor component are natural language, variants of the same word can be matched, such as by normalizing verbs to a common conjugation (from "running" or "ran" to "run) prior to matching. Such a match, while not exact, can meet the minimum match percentage. In such embodiments, the inference module 132 can be further configured to infer the measure of likelihood based on the set of first descriptors and on the descriptor based on the indication of the functionality.

In some embodiments, the file component is a first file component, the set of descriptors is a set of first descriptors, and the inference module 132 is further configured to receive the second file component extracted from the file as well as the indication of the functionality from the user 114. In some embodiments, the inference module 132 is further configured to identify a set of descriptors based on the second file component and to identify a set of descriptors based on the indication of the functionality. In such embodiments, the inference module 132 can be further configured to infer the measure of likelihood based on the set of first descriptors, the set of descriptors based on the second file component, and the set of descriptors based on the indication of the functionality.

In some embodiments, the set of descriptors is a set of first descriptors and the measure of likelihood is a first measure of likelihood. In some embodiments, the indication and/or specification of the functionality from the user 114 includes a second measure of likelihood of the functionality being associated with the file. In such embodiments, the inference module 132 can be further configured to identify a set of descriptors (also referred to as second descriptors) based on the indication of the functionality, and the first measure of likelihood is based on the set of first descriptors and the set of descriptors based on the indication of the functionality. In some embodiments, the inference module 132 can be further configured to infer a third measure of likelihood based on the first measure of likelihood and on the second measure of likelihood.

As discussed earlier, in some embodiments, multiple file components can be extracted from the file. In some embodiments, the inference module 132 can be configured to identify a set of descriptors (sometimes referred to as a set of first descriptors) associated with each file component from the file components. In some embodiments, the inference module 132 receives an indication and/or specification of the functionality from the user 114, and can be further configured to identify a set of descriptors (also referred to as second descriptors) based on the indication of the functionality. In such embodiments, the inference module 132 can be further configured to infer, based on the set of descriptors associated with each file component and the set of descriptors based on the indication of the functionality, the measure of likelihood of the functionality associated with the file.

In some embodiments, the inference module 132 is further configured to, for each file component, infer a conditional measure of likelihood based on the set of descriptors associated with each file component and the set of descriptors based on the indication of the functionality. In such embodiments, the inference module 132 can be further configured to infer the measure of likelihood of the functionality associated with the file (also referred to as an overall measure of likelihood) based on the conditional measure of likelihood for each file component.

In some embodiments, the inference module 132 is further configured to generate a group of two or more file components from the file components. In some embodiments, the inference module 132 is further configured to transmit an indication of the group (e.g., as a visual display) to the user 114, and to receive, from the user, the indication of the functionality of the file. The inference module 132 can then further identify a set of descriptors (also referred to as a set of first descriptors) associated with each file component, for example, by searching the database index for each file component. The inference module 132 can then further identify a set of descriptors (also referred to as a set of second descriptors) based on the received indication of the functionality, for example, by searching the database index for descriptors including keywords that satisfy a keyword relationship of the received indication of the functionality. In such embodiments, the inference module 132 can be further configured to infer the measure of likelihood of the functionality associated with the file based on the set of descriptors associated with each file component and the set of descriptors based on the received indication of the functionality.

The graph can be generated in any suitable manner that relates the two or more file components based on factors such as, but not limited to, the frequency of occurrence of each file component in the file, the frequency of occurrence of subgroups (e.g., pairs) of file components in proximity of each other in the file, the likelihood of one file component being invoked upon invocation of another file component when the file is executed, and/or the like. In some embodiments, the inference module 132 is further configured to generate the graph by calculating, based on pair wise analysis of the file components, conditional probabilities including a pair of conditional probabilities associated with each pair of file components. The inference module 132 can be further configured to generate a directed network as the group based on the conditional probabilities. In some embodiments, the inference module 132 can also be configured to generate a directed network based on information theoretic similarity measures such as, for example, pair wise mutual information.

Figure 2:
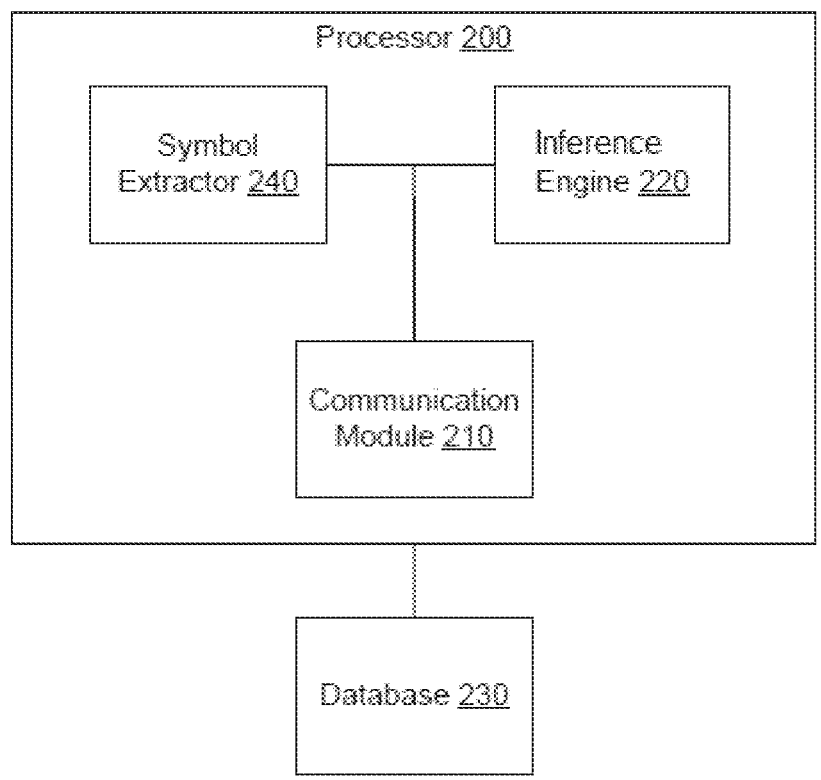
FIG. 2 is a schematic diagram that illustrates a processor configured to infer a measure of likelihood of a functionality associated with the file, according to an embodiment.

In some embodiments, aspects of the apparatus 100 described herein are configurable to automatically detect the functionality implemented within malicious binaries ("files"). As a non-limiting, exemplary embodiment, FIG. 2 illustrates a processor 200 (similar to processor 110) executing a symbol extractor 240 (similar to the extractor module 128), an inference engine 220 (similar to the inference module 132, and a communication module 210 (similar to the communication module 124), each also referred to as a "component". As shown in FIG. 2, the processor 200 can be operatively coupled to a database 230 (similar to the database 170 and/or the memory 160). In some embodiments, the processor 200 and the database 230 can be configured for performing automatic detection of the functionality of malicious software as disclosed in U.S. Provisional Patent Application No. 61/781,185, filed Mar. 14, 2013 and entitled "METHODS AND APPARATUS FOR PERFORMING AUTOMATIC DETECTION OF THE FUNCTIONALITY OF MALICIOUS SOFTWARE BY MINING WEB TECHNICAL DOCUMENT CORPORA," which is incorporated herein by reference in its entirety.

The components 210, 220, 230, and/or 240 can be, for example, any assembly and/or set of operatively-coupled electrical components, and can include, for example, a memory, a processor, electrical traces, optical connectors, software (executing or to be executed in hardware such as processor 200), hardware modules (e.g., a Field Programmable Gate Array (FPGA) an Application Specific Integrated Circuit (ASIC), a Digital Signal Processor (DSP)), and/or the like. Furthermore, each component 210, 220, 230 and/or 240 can be capable of performing one or more specific functions associated with that component, as discussed further below.

The communication module 210 can communicate with and/or receive web technical documents (similar to descriptors) from the network (e.g., the Internet). More specifically, the communication module 210 can search for and receive technical documents stored at and/or displayed by servers (e.g., the sources 112A-112C) operatively coupled to the network.

The database 230 can store a large number (e.g., millions) of web technical documents (e.g., gathered by and received from communication module 210) and can index the documents with a specialized indexing system, which indexes source code and natural language for fast retrieval based on keyword queries. In some embodiments, the Database 230 can include, for example, a random access memory (RAM), a memory buffer, a hard drive, a read-only memory (ROM), an erasable programmable read-only memory (EPROM), a database and/or so forth.

The symbol extractor 240 can extract technical symbols (similar to file components) from the suspected malware the user (e.g., the user 114) has provided for analysis. The Inference Engine 220 can include a machine-learning model/machine-learning based malware functionality profiling system, which uses the symbols extracted by Symbol Extractor 240 in conjunction with the database of technical documents to automatically determine what software functionality is implemented in a given malware sample. The terms "statistical model", "machine learning model", and variants thereof, refer to mathematical constructs whose parameters are set according to a data analysis process and that are used to make inferences about data.

In some embodiments, the database 230 can function and/or work as follows:
- web technical documents are retrieved from the network (e.g., the Internet);
- the documents are stored in the database 230, indexed based on the words (similar to keywords) and technical symbols (similar to descriptor components) contained in each document;
- database 230 allows for fast retrieval of documents based on Boolean keyword searches of the words contained in the documents;
- database 230 retrieves new technical documents at regular time intervals. Such time intervals can be specified and/or set by a user.

In some embodiments, the symbol extractor 240 can function and/or work as follows:
- the symbol extractor 240 can disassemble a malware sample using any suitable disassembly technique to produce an assembly-language representation of the malware sample;
- the symbol extractor 240 can then locate points in the assembly-language representation at which the malware sample's assembly code makes reference either to a) dynamically loaded functions or b) initialized printable string data. These are the "technical symbols" used later;
- in some embodiments, the symbol extractor 240 then also extracts printable subsequences of characters from the "initialized data" section of a malicious binary artifact of the malware sample;
- in some embodiments, the symbol extractor 240 extracts these printable subsequences of characters from the malware sample file. The output of the symbol extractor 240 can be a list of technical symbols identified in the malicious binary artifact of the malware sample;
- in some embodiments, the symbol extractor 240 also associates these technical symbols with one or more locations in the malware sample's disassembled assembly code that reference or make use of these technical symbols.

After the symbol extractor 240 has extracted a set of technical symbols from a malware sample, the inference engine 220 can then receive this set of technical symbols as an input and use the set of technical symbols to determine what software capabilities (similar to functionality of the file) the malware sample under analysis possesses.

In some embodiments, Inference Engine 220 implements this functionality as follows:
- before the inference engine 220 is run and/or executed, the user can configure inference engine to detect a list of capabilities that he or she specifies. The user can specify these capabilities as follows. For each capability the user wishes to detect, he or she specifies a name for the capability (e.g., "logs users keystrokes"), a list of keywords that describe that capability, joined together with Boolean operators (such as "keystroke" AND "logging", where AND is a Boolean operator);
- to determine whether or not a malware sample possesses a capability and/or functionality, the inference engine 220 can query the database 230, retrieving documents that describe the capability and/or functionality of interest, using the keywords and/or Boolean relationships specified by the user to retrieve these documents;
- the inference engine 220 can then retrieve additional sets of documents. For each technical symbol that the symbol extractor 240 has identified within the malware sample, the inference engine 220 can retrieve a set of documents (similar to a set of descriptors) including the documents that contain that symbol;
- given these sets, including the set of documents in which the keywords appear (similar to a set of descriptors based on a keyword relationship), and the per-symbol sets of documents gained from each technical symbol (similar to a set of descriptors for each file component of several file components extracted from a file), the inference engine 220 can then infer a probability (similar to overall measure of likelihood) that the malware has each of the capabilities and/or functionalities specified by the user, using the formula (1) below, and then the formula (2) below $$P(\text{capability} \mid \text{symbol}) = \frac{|\text{posts\_referencing\_capability} \cap \text{posts\_with\_symbol}|}{|\text{posts\_with\_symbol}|} \quad (1)$$

$$1 - \prod_{i}^{N} 1 - P(\text{capability} \mid \text{symbol}_i) \quad (2)$$

in some embodiments, the inference engine 220 can employ Bayesian inference to combine the user's prior belief in the malware sample possessing a given capability and/or functionality and the new evidence that inference engine obtains by performing the computations specified above. This inference is performed using the equation (3) below;

$$P(\text{Capability} \mid E) = \frac{P(E)P(\text{Capability})}{P(E)P(\text{Capability}) + P(E \mid \sim\text{Capability})P(\sim\text{Capability})} \quad (3)$$

the inference engine 220 can produce a human readable output for the operator. This output can include a list of capabilities in which the user is interested, coupled with the associated probabilities. These probabilities represent the probability that the malware artifact under analysis has the specified capability and/or functionality.

Figure 3:
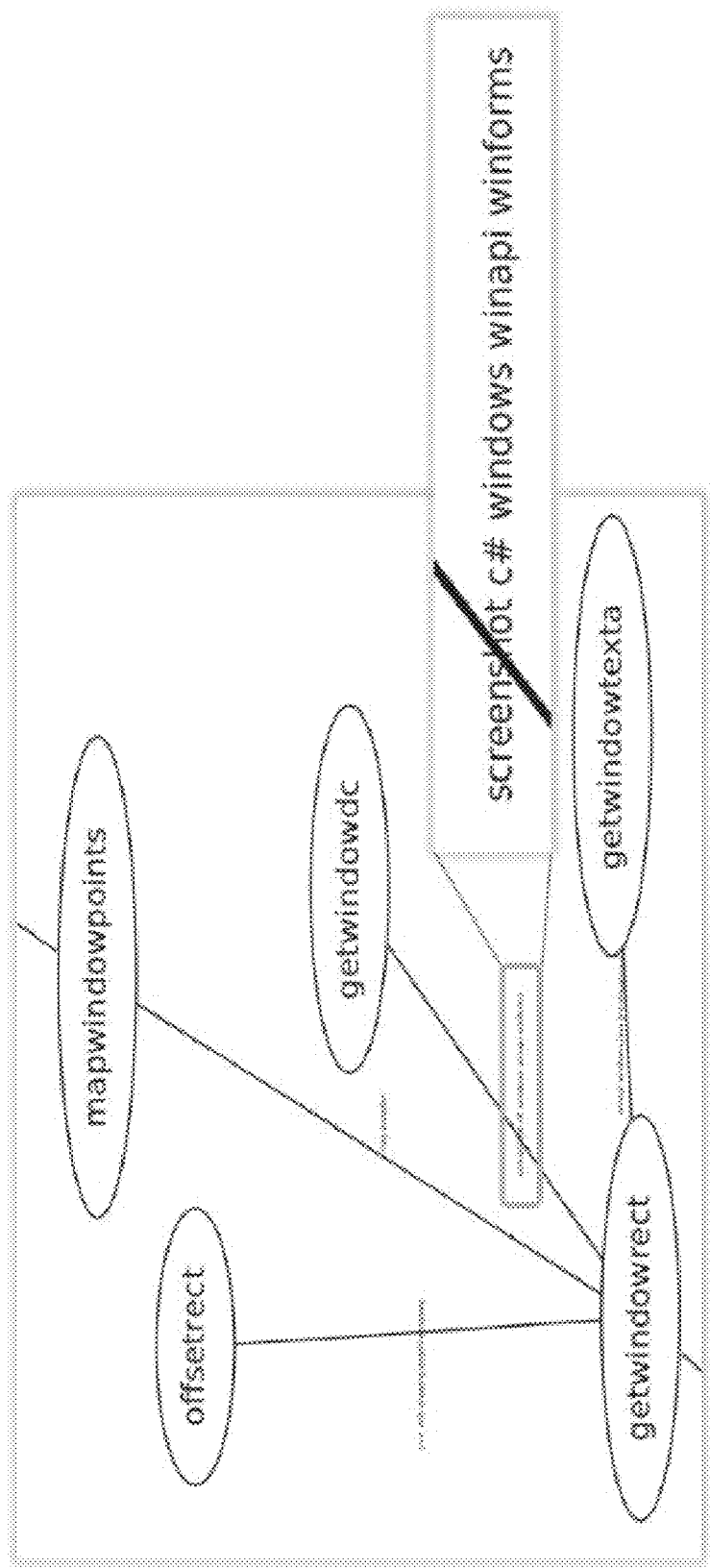
FIG. 3 is an exemplary technical symbol relationship graph associated with a malware sample.

In some embodiments, the inference engine 220 produces a technical symbol relationship network (similar to a graph) to allow the user to view the functional relationships between technical symbols extracted from the malware by the symbol extractor 240. When visualized, the relationship network allows an operator to explore the functional structure of a malware sample, and often reveals groups of technical symbols that are jointly used to achieve some malicious functionality. An example of a technical symbol relationship graph associated with allowing a malware sample to take surreptitious screenshots of a user's computer display is shown in FIG. 3.

The inference engine 220 can generate a technical symbol relationship graph for a malware sample as follows:
1. The inference engine 220 iterates over pairs of function calls the malware sample makes and monitors the following three counts over the document database. First, the inference engine 220 counts the number of times the first function call (function call A) occurs in the technical documents received via the network (e.g., web documents retrieved via the Internet). Second, the inference engine 220 counts the number of times the second function call (function call B) occurs in the technical documents received via the network (e.g., web documents retrieved via the Internet). Third, the inference engine 220 counts the number of times both function calls appear together in the technical documents received via the network (e.g., web documents retrieved via the Internet).
2. The inference engine 220 can use these counts to derive conditional probabilities in both directions, including P(call B) and P(call B|call A)—(i.e., the probability of call A appearing in a post given the occurrence of call B in a post, and vice versa).
3. The inference engine 220 can then output a file describing the resulting directed network, which the user can use to visualize the technical symbol relationship graph for the malware sample.

Aspects of the operation of the processor 200 described are beneficial for providing the following non-exhaustive list of capabilities:

Quickly generate a list of detected software capabilities for novel malware samples (for example, detecting that a malware sample has an Internet Relay Chat (IRC) Command and Control (C2), keystroke logging, or Hypertext Transfer Protocol (HTTP) downloading capability);

Provide probabilistic malware capability detections when appropriate: e.g., system output may read, "given the following evidence, it is 80% likely the sample uses IRC as a C2 channel, and 70% likely that it also encrypts this traffic.'";

Produce a functional relationship network for the technical symbols extracted from a given malicious binary. When visualized, this network reveals functional components within the malware, such as a "memory allocation component" or a "network component."; and/or Automatically remain current with the latest software engineering trends by refreshing its document database with new documents from the document sources (e.g., web pages on the Internet).

Figure 4:
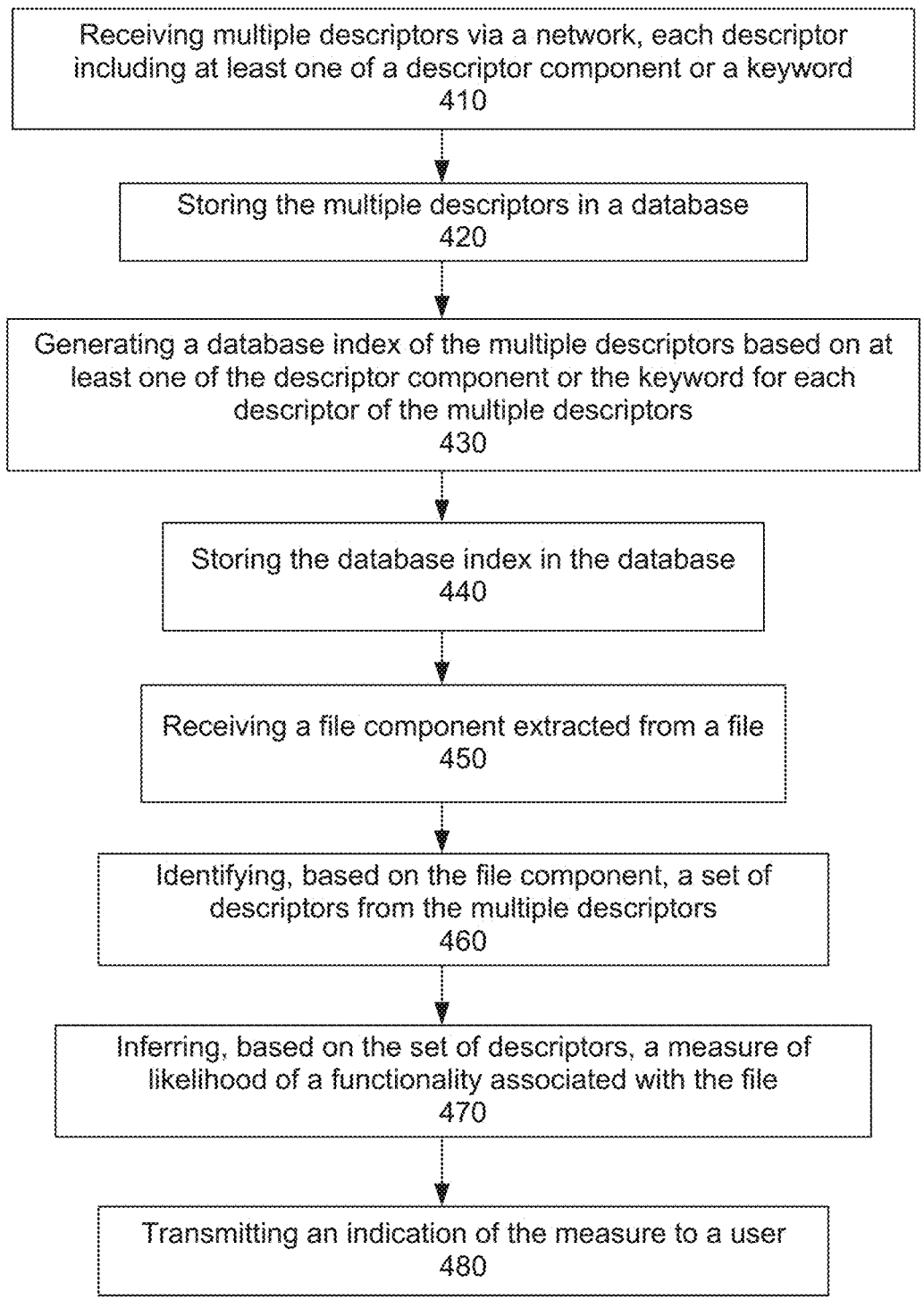
FIG. 4 is a flowchart illustrating a method for inferring a measure of likelihood of a functionality associated with a file, according to an embodiment.

FIG. 4 illustrates a method 400, according to an embodiment. It is understood that the method 400 can be performed by the apparatus 100 or the processor 200. The method 400 includes, at 410, receiving multiple descriptors via a network. Each descriptor includes at least one of a descriptor component or a keyword. In some embodiments, each descriptor component is a technical symbol, each keyword is a natural language word, and each descriptor is a natural language document. In some embodiments, a host device, such as one including the apparatus 100 and/or the processor 200, executes the method 400. In some embodiments, receiving the multiple descriptors via the network includes searching for descriptors at one or more locations remote to the host device. Such locations can be accessible by host device via the network (e.g., on servers connected to the Internet). In such embodiments, the method 400 further includes receiving the multiple descriptors via the network in response to the searching.

The method 400 further includes, at 420, storing the descriptors in a database. The method 400 further includes, at 430, generating a database index of the descriptors based on at least one of the descriptor component or the keyword for each descriptor of the multiple descriptors. As discussed earlier, the database index can include associations between one or more file components, between one or more keywords, and combinations thereof, extracted from the multiple descriptors. Additionally, each association can be linked to one or more descriptors from the multiple descriptors.

The method 400 further includes, at 440, storing the database index in the database. In some embodiments, the method 400 further includes periodically receiving additional descriptors, and storing the additional descriptors in the database. In some embodiments, the method 400 further includes updating the database index based on at least one of a descriptor component or a keyword for each descriptor from the additional descriptors to produce an updated database index, and storing the updated database index in the database. In this manner, the database and the database index can be continually updated not only with new descriptors, but with potentially new/modified associations.

The method 400 further includes, at 450, receiving a file component extracted from a file. The file component can be a technical feature such as, for example, a function name, a file path, and/or the like. In some embodiments, the file component can be commonly used programming syntax such as, for example, function calls, and extracting the file component can include searching for specific function calls, searching for text formatted as a function call, and/or the like.

The method 400 further includes, at 460, identifying, based on the file component, a set of descriptors from the multiple descriptors. In some embodiments, identifying the set of descriptors includes accessing the database including the plurality of descriptors, and identifying a descriptor from the multiple descriptors as a descriptor associated with the file component when at least one descriptor component of the document substantially matches the file component. As an example, the database index can indicate that the file component (e.g., a function call) is associated with the descriptor, when the file component is not found in the descriptor but is instead associated with a keyword found in the descriptor.

The method 400 further includes, at 470, inferring, based on the set of descriptors, a measure of likelihood of a functionality associated with the file. In some embodiments, the method 400 further includes receiving an indication of the functionality, such as from the user 114, who may be able to make an intelligent/educated guess of the functionality, who may be interested in determining whether the particular functionality is associated with the file, and/or the like. In some embodiments, the measure is at least one of a qualitative measure, a binary measure, a probabilistic measure, or a percentage measure.

The method 400 further includes, at 480, transmitting an indication of the measure to a user. The indication can be in any suitable format, including text, graphic, audio, video, and/or the like. In some embodiments, the indication can include a recommended action such as, for example, when the indication communicates that the file is potential malware, and can include a recommendation to delete the file, to run an anti-malware application, and/or the like.

While not shown in FIG. 4 in some additional embodiments, the set of descriptors is a set of first descriptors. As mentioned earlier, the method 400 can further include receiving an indication of the functionality from the user. In some embodiments, the method 400 further includes identifying, based on the indication of the functionality, a set of second descriptors. In some embodiments, inferring the measure of likelihood is based on the set of first descriptors and on the set of second descriptors. For example, in some embodiments, the measure of likelihood can be based on the extent of overlap between the set of first descriptors and the set of second descriptors. In other words, when the set of first descriptors maps to the file components and the set of second descriptors maps to the purported functionality, extensive overlap can indicate that the file has the functionality based on the file components, and little overlap that the file likely does not have the functionality despite the file components.

In some embodiments (not shown in FIG. 4), the set of descriptors is a set of first descriptors. The method 400 can further include receiving an indication of the functionality from the user. The indication of the functionality includes a keyword relationship associated with the functionality. The method 400 can further include accessing the database including the multiple descriptors, and identifying a descriptor from the multiple descriptors as a second descriptor associated with the functionality when the keyword of the descriptor substantially satisfies the keyword relationship. Keywords can include, for example, "SMTP" (Simple Mail Transfer Protocol), "IRC" (Internet Relay Chat), "bitcoin" (referring to a cryptocurrency) and/or any other word, acronym or recognizable group of characters. In some embodiments, inferring the measure of likelihood is based on the set of first descriptors and on the second descriptor. Examples of keyword relationships can include, but are not limited to, the presence of certain words/strings of words/terms (including parts thereof), the order of certain words/terms, the proximity of words/terms to each other, the frequency of a word/term, the presence of related words, and/or the like.

In some embodiments (not shown in FIG. 4), the set of descriptors is a set of first descriptors. The method 400 can further include receiving an indication of the functionality from the user. The method 400 can further include identifying, based on the indication of the functionality, a set of second descriptors. In some embodiments, inferring the measure of likelihood is based on the set of first descriptors and on the set of second descriptors. In some embodiments, the measure of likelihood includes a non-null measure when at least one descriptor from the set of first descriptors is equal to at least one descriptor from the set of second descriptors.

In some embodiments (not shown in FIG. 4), the file component is a first file component and the set of descriptors is a set of first descriptors. The method 400 can further include receiving a second file component extracted from the file, and identifying, based on the second file component, a set of second descriptors. In some embodiments, inferring the measure of likelihood is based on the set of first descriptors and the set of second descriptors.

In some embodiments (not shown in FIG. 4), the file component is a first file component and the set of descriptors is a set of first descriptors. The method 400 can further include receiving a second file component extracted from the file, and receiving an indication of the functionality from the user. The method 400 can further include identifying, based on the second file component, a set of second descriptors, and identifying, based on the indication of the functionality, a set of third descriptors. In some embodiments, inferring the measure of likelihood is based on the set of first descriptors, the set of second descriptors, and the set of third descriptors.

In yet other additional embodiments (not shown in FIG. 4), the set of descriptors is a set of first descriptors and the measure of likelihood is a first measure of likelihood. The method 400 can further include receiving an indication of the functionality from the user. The indication of the functionality includes a second measure of likelihood of the functionality being associated with the file. The method 400 can further include identifying, based on the indication of the functionality, a set of second descriptors. Inferring the first measure of likelihood is based on the set of first descriptors and on the set of second descriptors. The method 400 further includes inferring a third measure of likelihood based on the first measure of likelihood and on the second measure of likelihood.

Figure 5:
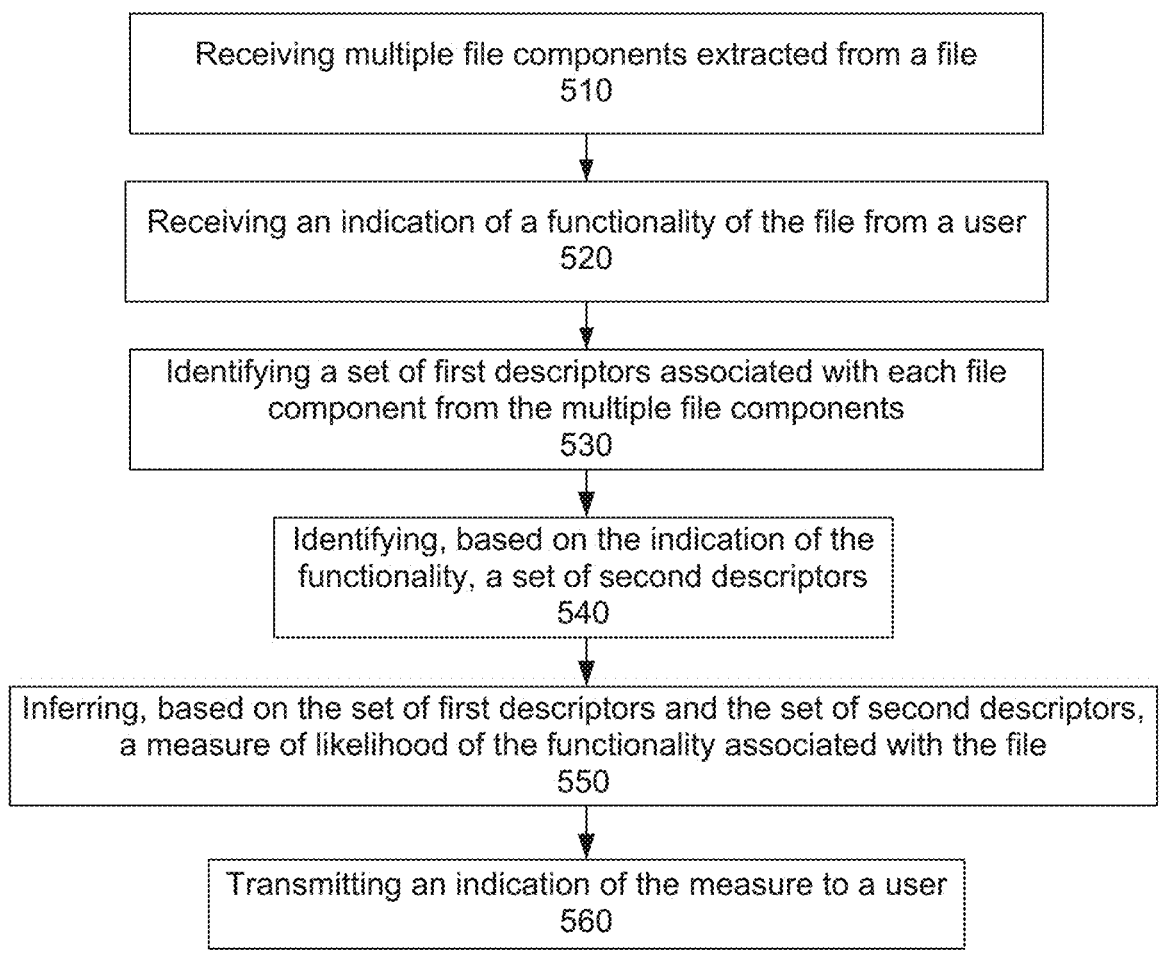
FIG. 5 is a flowchart illustrating a method for inferring a measure of likelihood of a functionality associated with a file, according to another embodiment.

FIG. 5 illustrates a method 500, according to an embodiment. It is understood that the method 500 can be performed by the apparatus 100 or the processor 200. The method 500 includes, at 510, receiving multiple file components extracted from a file. In some embodiments, the file is at least one of a binary file or an assembly language file.

The method 500 further includes, at 520, receiving an indication of a functionality of the file from a user. The user, such as the user 114, can receive the indication in any suitable format (e.g., text, graphic, audio, video, and/or the like).

The method 500 further includes, at 530, identifying a set of first descriptors associated with each file component from the multiple components. In some embodiments, the descriptor can be a document including function calls (similar to descriptor components) and text (keywords) describing the impact thereof.

The method 500 further includes, at 540, identifying, based on the indication of the functionality, a set of second descriptors. In some embodiments, the indication can include a keyword relationship associated with the functionality. In this manner, a sophisticated user familiar with standard and/or specific terminology used in descriptors can generate custom keyword relationships to define the functionality for which the user is looking.

The method 500 further includes, at 550, inferring, based on the set of first descriptors and the set of second descriptors, a measure of likelihood of the functionality associated with the file. As discussed above, the measure of likelihood can be used to detect false 'positives'. i.e., files which contain suspicious components but are nonetheless harmless, and can account for the diversity of files that can be analyzed yet cleared from having the purported functionality. The method 500 further includes, at 560, transmitting an indication of the measure to a user.

In some embodiments (not shown in FIG. 5), the method 500 can further include accessing a database including multiple descriptors received via a network. At least one descriptor from the multiple descriptors can include one or more keywords. In some embodiments, the method 500 can further include identifying a descriptor from the multiple descriptors as a second descriptor from the set of second descriptors associated with the functionality when the one or more keywords of the descriptor from the multiple descriptors substantially satisfies the keyword relationship.

In some embodiments (not shown in FIG. 5), the measure is an overall measure, and the method 500 can further include for each file component from the multiple file components, inferring a conditional measure of likelihood based on the set of first descriptors associated with that file component from the multiple file components and based on the set of second descriptors. In some embodiments, the method 500 further includes inferring the overall measure of likelihood based on the conditional measure of likelihood for each file component from the multiple file components.

In some embodiments and while not shown in FIG. 5, the method 500 can further include generating a set of groups. Each group from the set of groups includes two or more file components from the multiple file components. Each group from the set of groups can be associated with a different functionality. In some embodiments, the method 500 further includes transmitting an indication of the set of groups to the user. In such embodiments, the receiving the indication of the functionality at 520 can be in response to the transmitting the indication of the set of groups.

Referring again to FIG. 1, as stated earlier, the communication module 120 can be configured to filter, organize, modify and/or otherwise manipulate the search results in any suitable manner. In some embodiments, the communication module 120 can be configured to employ one or more search engines for improving the relevance of search results. In some embodiments, the one or more search engines can provide scoring, such as a Bayesian score, for each documents that accounts for variations between descriptors/ documents that human analysis would still deem to be classified together.

Referring again to FIG. 1, as stated earlier, the inference module 132 can be configured to substantially match the file components and the descriptor components even when an exact match is not found. In some embodiments, the inference module 132 can be further configured to employ variants of the file components and the descriptor components to identify which representation of each works best. For example, related file components and/or descriptors can be matched. For example, the function call "CreateFile" can be matched with the function call "CreateFileEx" because "CreateFileEx" is an extended version of "CreateFile." Thus, a file component "CreateFileEx" can be matched with a descriptor describing "CreateFile."

For another example, in some embodiments, the file components and the descriptor components are case preserved when compared. In some embodiments, the file components and the descriptor components are lowercase normalized when compared. In some embodiments, the file components and the descriptor components are camelcase tokenized when compared. In some embodiments, the file components and the descriptor components are compared based on 1-gram, 2-gram, 3-gram . . . n-gram strings extracted. The following are non-limiting examples of different representations of file components and descriptor components that can be employed, alone or in combination:

Lowercase normalized word 1-grams
  Lowercase normalized word 2-grams
  Lowercase normalized word 3-grams
  Camelcase tokenized 1-grams
  Camelcase tokenized 2-grams
  Camelcase tokenized 3-grams
  Case-preserved 1-grams In some embodiments, various combinations of the different representations listed above can be employed, and the combination(s) providing the best match can be selected as the result of the matching process.

Referring again to FIG. 1, as stated earlier, the database 170 and/or the memory 160 can store the received descriptors as an indexed schema. In other embodiments, the received descriptors can be stored in a key value store in the memory 160 for ease of search, i.e., in a schema-less manner. In some embodiments, the key value store can be combined with a Natural Language Processing (NLP) pipeline. One benefit of combining the key value store with the Natural Language Processing pipeline is that it allows for a large number of possible descriptor normalizations, including any combination of normalizations such as lowercasing, verb deconjugation, normalization of plural words to singular form, normalization of upper case words to lower case words and/or the like. The benefit of the key-value store is that it allows for fast, Random Access Memory based lookups of values that can accelerate the efficiency and speed of the system.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. A method, comprising:
    searching for natural language descriptors displayed on a plurality of web pages;
    receiving, at the host device and in response to the searching, a plurality of natural language descriptors, each natural language descriptor from the plurality of natural language descriptors including information relating to a functionality associated with that natural language descriptor;
    extracting at least one descriptor component and at least one natural language keyword from each natural language descriptor from the plurality of natural language descriptors, the at least one descriptor component and the at least one natural language keyword extracted from each natural language descriptor from the plurality of natural language descriptors are associated with that natural language descriptor;
    storing the plurality of natural language descriptors in a database;

generating a database index of the plurality of natural language descriptors based on at least one of the descriptor component or the natural language keyword for each natural language descriptor from the plurality of natural language descriptors;

receiving a file component extracted from a potential malware file;

receiving, from a user, a natural language indication of potential behavior of the potential malware file;

identifying a set of natural language descriptors from the plurality of natural language descriptors based on (1) the file component, (2) the at least one descriptor component of each natural language descriptor from the set of natural language descriptors, (3) the at least one natural language keyword of each natural language descriptor from the set of natural language descriptors, and (4) the natural language indication of potential behavior of the potential malware file;

inferring, based on the set of natural language descriptors including both a first natural language descriptor having a descriptor component within the file component and a second natural language descriptor having a descriptor component within the file component, a measure of likelihood of the potential malware file being malicious; and transmitting an indication of the measure to a user so as to instruct the user to perform a predetermined malware remediation action.

2. The method of claim 1, wherein the measure is at least one of a qualitative measure, a binary measure, a probabilistic measure, or a percentage measure.

3. The method of claim 1, wherein the identifying the set of natural language descriptors includes:

accessing the database including the plurality of natural language descriptors;

identifying a natural language descriptor from the plurality of natural language descriptors as a natural language descriptor associated with the file component when at least one descriptor component of the natural language descriptor substantially matches the file component; and identifying a natural language descriptor from the plurality of natural language descriptors as a natural language descriptor associated with the natural language indication of potential behavior of the potential malware file when at least one keyword of the natural language descriptor substantially matches the natural language indication of potential behavior of the potential malware file.

4. The method of claim 1, wherein the natural language indication of behavior associated with the potential malware file includes a keyword relationship associated with the functionality, the method further comprising:

accessing the database including the plurality of natural language descriptors; and identifying a natural language descriptor from the plurality of natural language descriptors to include in the set of natural language descriptors and that is associated with the behavior associated with the potential malware file when the keyword of the natural language descriptor substantially satisfies the keyword relationship.

5. The method of claim 1, wherein the measure of likelihood includes a non-null measure when at least one natural language descriptor from a first subset of the set of natural language descriptors is equal to at least one natural language descriptor from a second subset of the set of natural language descriptors, the first subset of the set of natural language descriptors being associated with the file component, the second subset of the set of natural language descriptors being associated with the natural language indication of potential behavior of the potential malware file.

6. The method of claim 1, wherein the file component is a first file component and the set of natural language descriptors is a set of first natural language descriptors, the method further comprising:

receiving a second file component extracted from the potential malware file; and identifying, based on the second file component, a set of second natural language descriptors, the inferring the measure of likelihood is based on the set of first natural language descriptors and the set of second natural language descriptors.

7. The method of claim 1, wherein the file component is a first file component and the set of natural language descriptors is a set of first natural language descriptors, the natural language indication of potential behavior of the potential malware file is a first natural language indication of potential behavior of the potential malware file, the method further comprising:

receiving a second file component extracted from the potential malware file;

receiving a second natural language indication of potential behavior of the potential malware file;

identifying, based on the second file component, a set of second natural language descriptors; and identifying, based on the second natural language indication of potential behavior of the potential malware file, a set of third natural language descriptors, the inferring the measure of likelihood being based on the set of first natural language descriptors, the set of second natural language descriptors, and the set of third natural language descriptors.

8. The method of claim 1, wherein the set of natural language descriptors is a set of first natural language descriptors and the measure of likelihood is a first measure of likelihood, the natural language indication of potential behavior of the potential malware file including a second measure of likelihood of the potential malware file being malicious, the method further comprising:

identifying, based on the natural language indication of potential behavior of the potential malware file, a set of second natural language descriptors, the inferring the first measure of likelihood being based on the set of first natural language descriptors and on the set of second natural language descriptors; and inferring a third measure of likelihood based on the first measure of likelihood and on the second measure of likelihood.

9. The method of claim 1, further comprising:

periodically receiving additional natural language descriptors; and storing the additional natural language descriptors in the database.

10. The method of claim 1, wherein each descriptor component is a technical symbol, each natural language keyword is a natural language word, and each natural language descriptor is a natural language document.

11. A method, comprising:

receiving a plurality of file components extracted from a potential malware file;

receiving a natural language indication of a functionality of the potential malware file from a user;

identifying a set of first natural language descriptors associated with each file component from the plurality of file components based on a plurality of descriptor components associated with each natural language descriptor from the set of first natural language descriptors;

identifying, based on the natural language indication of the functionality and based on natural language descriptor keywords, a set of second natural language descriptors, each natural language descriptor from the set of second natural language descriptors being identified in response to searching each web page from a plurality of web pages for natural language descriptors displayed on that web page;

inferring, based on the set of second natural language descriptors including both (1) a first natural language descriptor from the set of first natural language descriptors and having a descriptor component within a file component from the plurality of file components and (2) a second natural language descriptor from the set of first natural language descriptors and having a descriptor component within a file component from the plurality of file components, a measure of likelihood of the potential malware file being malicious; and transmitting an indication of the measure to a user.

12. The method of claim 11, wherein the measure is an overall measure, the inferring the overall measure of likelihood including:

for each file component from the plurality of file components, inferring a conditional measure of likelihood based on the set of first natural language descriptors associated with that file component from the plurality of file components and based on the set of second natural language descriptors; and inferring the overall measure of likelihood based on the conditional measure of likelihood for each file component from the plurality of file components.

13. The method of claim 11, wherein the indication of the measure includes a keyword relationship associated with the functionality, the identifying the set of second natural language descriptors including:

accessing a database including a plurality of natural language descriptors received via a network, at least one natural language descriptor from the plurality of natural language descriptors including one or more natural language keywords; and identifying a natural language descriptor from the plurality of natural language descriptors as a natural language descriptor from the set of second natural language descriptors associated with the functionality when the one or more natural language keywords of the natural language descriptor from the plurality of natural language descriptors substantially satisfies the keyword relationship.

14. The method of claim 11, wherein the file is at least one of a binary file or an assembly language file.

15. The method of claim 11, further comprising:

generating a set of groups, each group from the set of groups including two or more file components from the plurality of file components, each group from the set of groups associated with a different functionality; and transmitting an indication of the set of groups to the user, the receiving the natural language indication of the functionality being in response to the transmitting the indication of the set of groups.

16. An apparatus, comprising:

a memory; and a processor operatively coupled to the memory and configured to execute processor readable instructions stored in the memory, the processor configured to extract a plurality of file components from a potential malware file;

the processor configured to:

receive the plurality of file components;

generate a group including two or more file components from the plurality of file components;

transmit an indication of the group to a user;

receive, from the user, an indication of a functionality of the potential malware file in response to the indication of the group;

identify a set of first natural language descriptors associated with each file component from the plurality of file components, based on descriptor components associated with each natural language descriptor from the set of first natural language descriptors;

identify based on the indication of the functionality, a set of second natural language descriptors, each natural language descriptor from the set of second natural language descriptors being identified in response to searching each web page from a plurality of web pages for natural language descriptors displayed on that web page;

infer, based on the set of second natural language descriptors including both (1) a first natural language descriptor from the set of first natural language descriptors and having a descriptor component within a file component from the plurality of file components and (2) a second natural language descriptor from the set of first natural language descriptors and having a descriptor component within a file component from the plurality of file components, a measure of likelihood of the potential malware file being malicious; and transmit an indication of the measure to a user.

17. The apparatus of claim 16 wherein the processor is configured to generate the group by:

calculating, based on analysis of the plurality of file components, a plurality of conditional probabilities, the plurality of conditional probabilities including a pair of conditional probabilities associated with pairs of file components from the plurality of file components; and generating a directed network as the group based on the plurality of conditional probabilities.

18. The apparatus of claim 16, wherein the processor is further configured to access a database storing a plurality of documents each including one or more document components, the processor configured to generate a database index of the plurality of documents based on the one or more document components of each document from the plurality of documents, the processor configured to identify the set of first natural language descriptors by identifying a document from the plurality of documents as a first natural language descriptor based on the document being returned as a search result upon searching the database for a file component from the plurality of file components.

19. The apparatus of claim 16, the indication of the functionality including a keyword relationship, the processor being further configured to access a database storing a plurality of documents each including one or more keywords, the processor configured to generate a database index of the plurality of documents based on the one or more document components of each document from the plurality of documents, the processor configured to identify the set of second natural language descriptors by identifying a document from the plurality of documents as a natural language descriptor from the set of second natural language descriptors based on the document being returned as a search result upon searching the database index for documents including keywords that satisfy the keyword relationship.

20. The apparatus of claim 16, wherein the measure of likelihood is a first measure of likelihood, the indication of functionality includes a second measure of likelihood of the potential malware file being malicious, the processor configured to infer a third measure of likelihood based on the first measure of likelihood and on the second measure of likelihood.

21. The apparatus of claim 16, wherein the processor is further configured to search for documents at one or more servers remote to the processor, the one or more servers accessible by the processor via a network, the processor being configured to receive a plurality of documents via the network in response to the searching, each document from the plurality of documents including one or more document components, the processor is further configured to store the plurality of documents in a database, the processor is further configured to generate a database index of the plurality of documents based on the one or more document components of each document from the plurality of documents, the processor is further configured to identify the set of first natural language descriptors by identifying a document from the plurality of documents as a first natural language descriptor based on the document being returned as a search result upon searching the database for a file component from the plurality of file components.

22. The method of claim 1, wherein the natural language descriptors include text displayed on the plurality of webpages.

23. The method of claim 1, wherein the at least one descriptor component from each natural language descriptor from the plurality of natural language descriptors includes at least one of a function name or a file path.

24. The method of claim 1, wherein the searching for natural language descriptors displayed on the plurality of web pages includes at least one of crawling, spidering, tracking or scraping the plurality of webpages presented by a plurality of servers.

25. The method of claim 1, wherein the searching for natural language descriptors includes locating and indexing information displayed on the plurality of webpages presented by a plurality of servers.

26. The method of claim 1, wherein the measure of likelihood is a percentage that the potential behavior is performed by the potential malware file.

27. The method of claim 1, wherein the measure of likelihood represents a percentage that the potential malware file is malware.

28. The method of claim 1, wherein the measure of likelihood is based on a proximity within the file component of the descriptor component of the first natural language descriptor to the descriptor component of the second natural language descriptor.

29. The method of claim 1, wherein the measure of likelihood is based on the descriptor component of the first natural language descriptor configured to call the descriptor component of the second natural language descriptor within the file component.

30. The method of claim 1, wherein the measure of likelihood is based on a predetermined percentage of the set of natural language descriptors identifying the file component as likely malicious.

31. The method of claim 1, wherein the indication of potential behavior is an indication of functionality of the potential malware file, the method further comprising:

inferring, based on the set of natural language descriptors, a measure of likelihood of functionality of the potential malware file such that the inferring the measure of likelihood of the potential malware file being malicious is based on the measure of likelihood of functionality of the potential malware file.

* * * * *